(12) United States Patent
Monmayrant et al.

(10) Patent No.: US 9,036,967 B2
(45) Date of Patent: May 19, 2015

(54) POLARIZATION-INSENSITIVE OPTICAL FILTER WHICH HAS RESONANT GRATINGS AND IS ADJUSTABLE ACCORDING TO THE INCIDENCE ANGLE

(75) Inventors: Antoine Monmayrant, Toulouse (FR); Olivier Gauthier-Lafaye, Toulouse (FR); Kristel Chan Shin Yu, Ramonville Saint Agne (FR); Anne-Laure Fehrembach, Marseilles (FR); Anne Sentenac, Marseilles (FR); Philippe Arguel, Toulouse (FR); Jacques Loesel, Goyrans (FR)

(73) Assignees: Centre National d'Etudes Spatiales (FR); Centre National de la Recherche Scientifique (CNRS) (FR)

( * ) Notice: Subject to any disclaimer, the term of this patent is extended or adjusted under 35 U.S.C. 154(b) by 0 days.

(21) Appl. No.: 13/978,248

(22) PCT Filed: Jan. 3, 2012

(86) PCT No.: PCT/EP2012/050051
§ 371 (c)(1),
(2), (4) Date: Jul. 3, 2013

(87) PCT Pub. No.: WO2012/093119
PCT Pub. Date: Jul. 12, 2012

(65) Prior Publication Data
US 2013/0301988 A1   Nov. 14, 2013

(30) Foreign Application Priority Data
Jan. 3, 2011  (FR) ..................... 11 50021

(51) Int. Cl.
*G02B 6/34*   (2006.01)
*G02B 5/18*   (2006.01)
(Continued)

(52) U.S. Cl.
CPC ................ *G02B 6/34* (2013.01); *G02B 5/1866* (2013.01); *G01J 3/18* (2013.01); *G02B 5/1809* (2013.01); *G02B 5/203* (2013.01); *G02B 5/288* (2013.01)

(58) Field of Classification Search
CPC ........ G02B 5/18; G02B 5/1866; G02B 5/203; G02B 6/124; G02B 6/29304
USPC ............................................................ 385/37
See application file for complete search history.

(56) References Cited

U.S. PATENT DOCUMENTS 5,420,947 A  *  5/1995  Li et al. ........................... 385/37
7,627,018 B1 * 12/2009  Guilfoyle et al. ............. 372/102
(Continued)

FOREIGN PATENT DOCUMENTS

EP    1767964 A1    3/2007
FR    2856804 A1   12/2004

OTHER PUBLICATIONS

Fehrembach et al: "Study of waveguide grating eigenmodes for unpolarized filtering applications", Mar. 1, 2003, Journal of the Optical Society of America A, Optical Society of America, US, pp. 481-488, XP002272834.

(Continued)

*Primary Examiner* — Charlie Y Peng
(74) *Attorney, Agent, or Firm* — Lerner, David, Littenberg, Krumholz & Mentlik, LLP

(57) ABSTRACT

The invention relates to a polarization-insensitive optical filter centered on a wavelength measured in vacuum, comprising: first and second waveguides each having a propagation mode; a first grating formed in or on the surface of the first waveguide, the first grating being periodical at least along a first axis Ox defining a first orthonormal base Oxyz; a second grating formed in or on the surface of the second waveguide, the second grating being periodical at least along a second axis Ox' defining a second orthonormal base Ox'y'z; wherein the first and second grating are provided one above another and are such that the first axis Ox and the second axis Ox' define an angle $\xi$ different from $\pm\pi/2$ radians so that, when the first grating is illuminated by a light beam, the propagation modes are excited and have orthogonal fields for an angle of incidence of the light beam.

18 Claims, 3 Drawing Sheets

(51) Int. Cl.
  *G01J 3/18* (2006.01)
  *G02B 5/20* (2006.01)
  *G02B 5/28* (2006.01)

(56) References Cited

U.S. PATENT DOCUMENTS

| | | | |
|---|---|---|---|
| 7,678,567 B2* | 3/2010 | Uematsu et al. | 435/288.7 |
| 2003/0031443 A1* | 2/2003 | Soljacic et al. | 385/125 |
| 2004/0240064 A1* | 12/2004 | Dutta | 359/573 |
| 2006/0008206 A1* | 1/2006 | Maisenhoelder et al. | 385/37 |
| 2006/0082770 A1* | 4/2006 | Cunningham et al. | 356/326 |
| 2008/0117508 A1* | 5/2008 | Miyawaki | 359/486 |
| 2008/0165820 A1* | 7/2008 | Fukuda | 372/53 |
| 2013/0050829 A1* | 2/2013 | Efimov | 359/569 |

OTHER PUBLICATIONS

French Search Report for Application No. FR1150021 dated Sep. 12, 2011.

International Search Report for Application No. PCT/EP2012/050051 dated Apr. 10, 2012.

Mizutani A et al: "Nonpolarizing guided-mode resonant grating filter for oblique incidence", Jun. 1, 2001, Journal of the Optical Society of America. A, Optics and Image Science, Optical Society of America, US, pp. 1261-1266, XP002272835.

\* cited by examiner

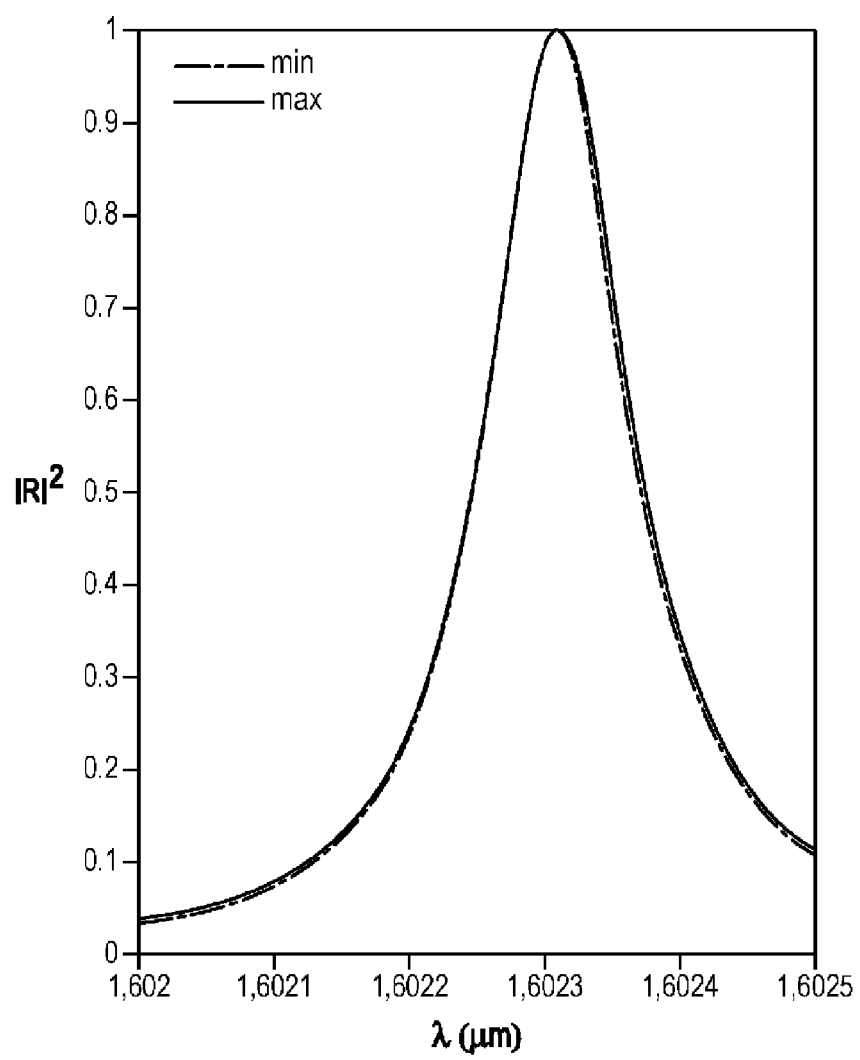

POLARIZATION-INSENSITIVE OPTICAL FILTER WHICH HAS RESONANT GRATINGS AND IS ADJUSTABLE ACCORDING TO THE INCIDENCE ANGLE

CROSS REFERENCE TO RELATED APPLICATIONS

The present application is a national phase entry under 35 U.S.C. §371 of International Application No. PCT/EP2012/050051, filed on Jan. 3, 2012, which claims priority from French Patent Application No. 1150021, filed Jan. 3, 2011, the disclosures of which are incorporated by reference herein.

GENERAL TECHNICAL FIELD

The invention relates to optical filters in free space, based on resonant gratings, ultra-selective in wavelength, (that is, having bandwidth less than 1 nm) adjustable according to the angle of incidence. Such filters are also known under the name of resonance filters of guide or Fano resonance filter mode.

PRIOR ART

Optical filters with resonant gratings are optical wavelength filtering components for producing very narrow bandwidth (of the order of $10^{-10}$ meters) and a very high rejection rate.

And when bandwidth is very narrow, they are used in Raman spectroscopy or for Laser safety in some optical instruments.

Optical filters with resonant gratings are structures comprising a sub-wavelength grating etched onto a multi-layer structure.

The grating allows coupling via an evanescent diffraction order of the energy of an incident beam in free space to an optical mode of the multi-layer structure which uses a waveguide. There is also excitation of the optical mode. It is specified that an optical mode be characterised by its electromagnetic field and its dispersion relation (relation between the wavelength of the mode and the direction of propagation of the incident wave). The grating also enables uncoupling from the optical mode to the free space in a direction corresponding to the specular reflection on the surface.

This coupling/uncoupling is done of course only for a wavelength and a fixed direction of incidence (linked by the dispersion relation). The other wavelengths pass through the filter without deviating.

This accordingly results in optical filters selective in wavelength, which can be extremely narrow and which are adjustable in wavelength as a function of the angle of incidence.

It is specified here that a filter is said to be adjustable if its filtering wavelength can be modified by playing on a parameter of the structure (optical index, thickness of layers, etc.) or on a parameter of incidence.

In the following an Oxyz base is defined in which an incident beam I and θ and Φ the angular coordinates of a point P belonging to the incident beam I are considered. θ is the polar angle, that is, the angle between the axis Oz and the radius OP and Φ the azimuth angle, that is, the angle of the projection OP on the plane (xOy) with the axis Ox. The plane of incidence is also defined as being the plane containing the normal (Oz) to the plane of the layers, and the radius OP. FIG. 1 illustrates the conventions used here.

A problem with these filters is their dependence on polarisation especially in oblique incidence.

It is specified here that a filter is said to be sensitive to polarisation if the centering wavelength and the width of its spectral response vary as a function of the state of polarisation of the incident wave. For a filter in transmission (respectively in reflection), the dependence on polarisation is defined by the ratio between minimal transmission (respectively reflection) and maximal transmission (respectively reflection) when the state of polarisation of the incident wave describes all the accessible states of polarisation ("Polarization Dispersion Losses", (PDL)). This measurement is generally expressed in dB, and is ideally 0 dB for a component insensitive to polarisation.

Also, if the dispersion relations of two modes have a point of intersection, then the modes are said to be degenerated at this point.

Filters having resonant gratings insensitive to polarisation based on simultaneous excitation by the incident waves s and p are known, via two different diffraction orders of the grating, of two orthogonal modes degenerated for a single wavelength. The two orthogonal modes can be a couple of modes whereof the field is symmetrical/asymmetrical relative to the plane of incidence, which therefore must be a plane of symmetry of the structure. Degeneration occurs when combining of the modes is cancelled by one of the following two techniques:
  either by selecting the pattern of the grating such that there is zero coupling between the diffraction orders of the grating for exciting each mode, while maintaining non-zero coupling between the incident wave and each mode (condition easily practicable with a periodic grating in a single direction, and requiring complex patterns for a periodic grating in two directions);
  or by selecting the angle of polar incidence (the angle of incidence azimuth per se is fixed such that the plane of incidence is a plane of symmetry of the structure) such that the angle between the directions of propagation of the two modes is close to λ/2 radians (a condition impracticable with a periodic grating in a single direction, but workable with a periodic grating in two orthogonal directions or forming an angle of λ/3 radians).

Also, in this type of configuration it is known that the bandwidth of the filter is insensitive to polarisation if the angle between the directions of propagation of the two modes is close to λ/2 radians, which favours the second technique described previously and periodic gratings in directions. However, the orthogonality between the directions of propagation of the modes is obtained for one angle of polar incidence only, making it difficult to adjust these filters in wavelength.

PRESENTATION OF THE INVENTION

An aim of the invention is a filter with resonant gratings insensitive to polarisation, irrespective of the angle of incidence and adjustable in wavelength according to the angle of incidence.

To achieve this aim, the invention relates to an optical filter insensitive to polarisation centred on a wavelength measured in a vacuum, comprising:
  a first waveguide supporting a first propagation mode and a second waveguide supporting a second propagation mode;
  a first grating formed in or on the surface of the first waveguide, the first grating being periodic at least along a first axis Ox defining a first orthonormal base Oxyz;

a second grating formed in or on the surface of the second waveguide, the second grating being periodic at least along a second axis Ox' defining a second orthonormal base Ox'y'z.

The optical filter according to the invention is such that the first and the second gratings are arranged one above another and are such that the first axis Ox and the second axis Ox' form an angle different to ±λ/2 radians such that when the first grating is illuminated by a light beam the first and second propagation modes are excited, and their fields are orthogonal for an angle of incidence of the light beam.

Other aspects of the optical filter according to the invention are the following:
- the first grating and the second grating are identical and each comprises a series of patterns or grooves identical of period $d=d_1=d_2$ and in which the angle $\xi$ is such that, for an incident beam of any angle of incidence on the first grating, for the polar angle $\theta$, corresponding to the incident beam, varying from $-\lambda/2$ to $\lambda/2$ radians, the azimuth angle $\Phi$, corresponding to the incident beam equal to $\pi/4+\xi/2$ radians;
- the series of patterns or grooves identical has width D, and height h;
- the wavelength is equal to $\lambda_0=1.6$ μm, the gratings have grooves of period d=838 nm, width D=300 nm and height h=70 nm;
- the first waveguide and the second waveguide are identical and are each constituted by a plurality of layers made of material transparent to the wavelength of interest;
- the first waveguide and the second waveguide are each constituted by two layers of dielectric material of different refractive index;
- it comprises a glass substrate arranged between the first waveguide and the second waveguide;
- it comprises gratings of periodicity dimension greater than one (2D gratings);
- it comprises a glass substrate arranged between the first grating and the second grating;
- it comprises a glass substrate arranged between the first grating and the second waveguide.

The combination of two waveguides each supporting a propagation mode with the cascading of two unidimensional resonant gratings arranged relative to each other fulfils the need of independence of polarisation and adjustability in wavelength as a function of the angles of polar and azimuth incidence.

The uncoupling between the two sets (grating plus waveguide) is such that the modes are degenerated, irrespective of the angle of polar incidence of the incident beam, for a given azimuth angle which depends in general on the polar angle.

Therefore, the two gratings couple the incident beam in a waveguide for the same resonance wavelength, irrespective of the angle of polar incidence. Also, for an angle of polar incidence the modes are orthogonal, producing independence of polarisation.

In particular, when the two waveguides and the two gratings are identical, the azimuth angle for which the two modes are degenerated does not depend on the polar angle and is such that the plane of incidence contains the bisector of the directions of periodicity. Adjustability is then achieved by having the angle of polar incidence only vary, the angle of azimuth incidence (and therefore the plane of incidence) being fixed, representing a major advantage for use of the filter. In addition, as in the general case, for an angle of polar incidence the modes are orthogonal, producing independence of polarisation.

This property is conserved over a wide range of angles of polar incidence.

Using unidimensional resonant gratings is simpler than using bidimensional gratings.

Also, as the gratings are unidimensional, the nominal angle of incidence can be modified simply by playing on the grating parameters (period and orientation of the gratings), as opposed to the optical filters using bidimensional gratings which require modifying of the form of the bidimensional grating as well as the structure of the subjacent waveguide.

PRESENTATION OF THE FIGURES

FIG. 1 illustrates a coordinate space according to the invention.

Other characteristics and advantages of the invention will emerge from the following description which is purely illustrative and non-limiting and must be considered in light of the attached drawings, in which, apart from FIG. 1 already discussed:

FIG. 2 schematically illustrates a partial three-dimensional view of an optical filter according to the invention;

FIG. 3 schematically illustrates the orientation of the two gratings of an optical filter according to the invention;

FIG. 5 illustrates the minimal and maximal coefficients of reflection obtained when the state of polarisation of the incident wave describes all the states of polarisation accessible as a function of the working wavelength of an optical filter according to the invention.

In all the figures, similar elements bear identical reference numerals.

DETAILED DESCRIPTION OF THE INVENTION

Figure 1:
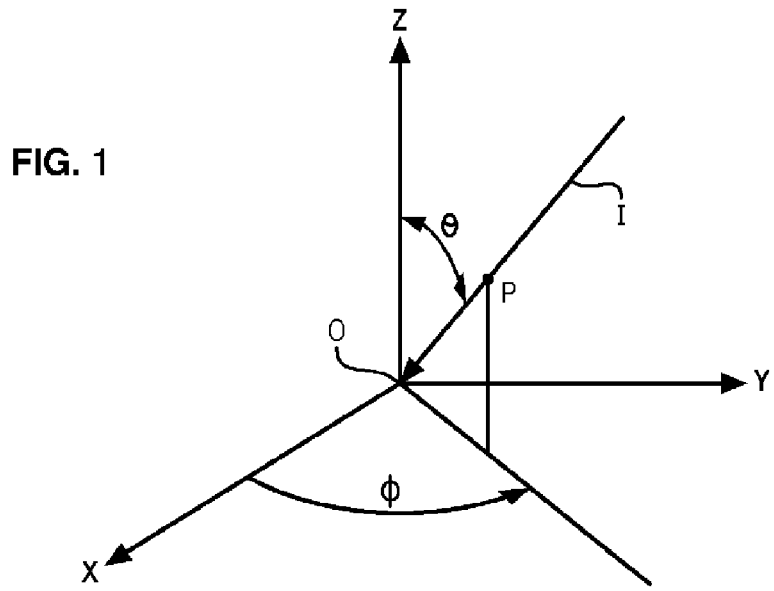
Figure 2:
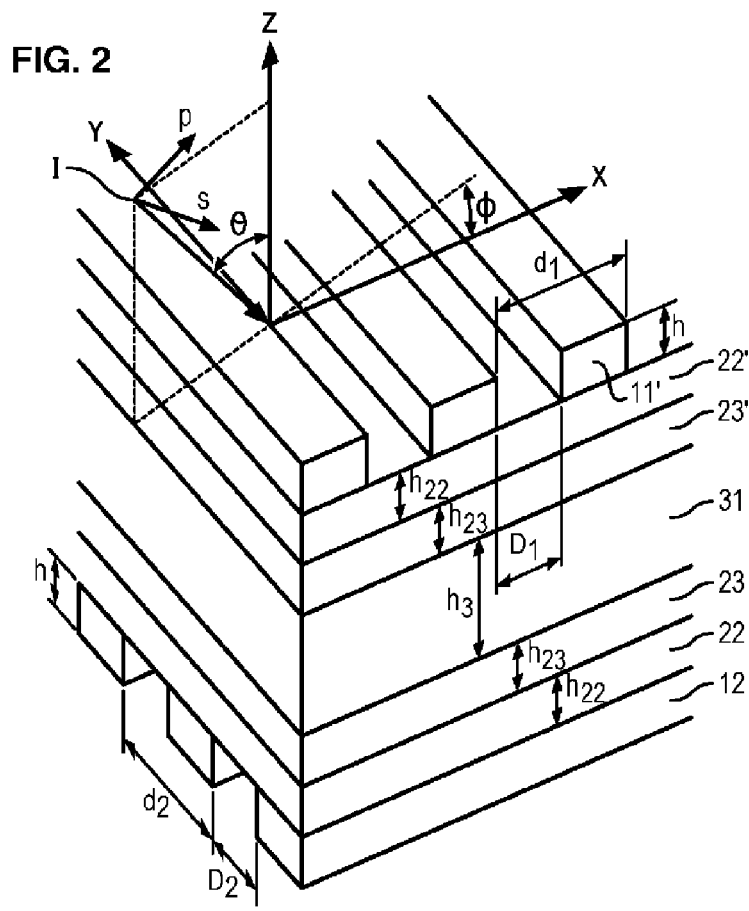
Figure 3:
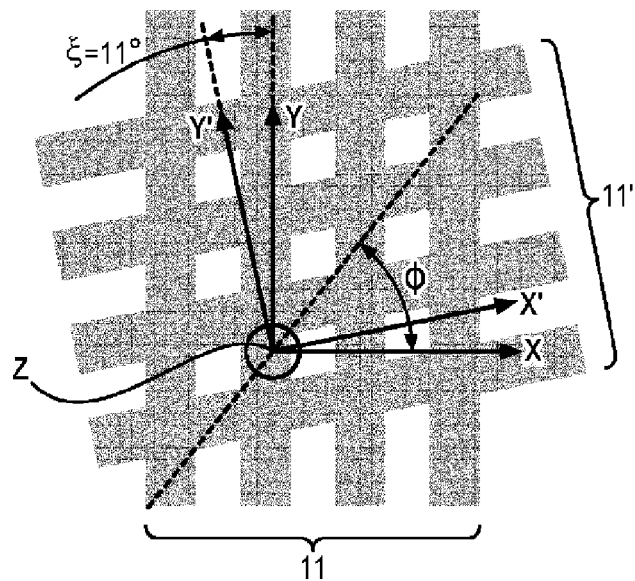
Figure 4:
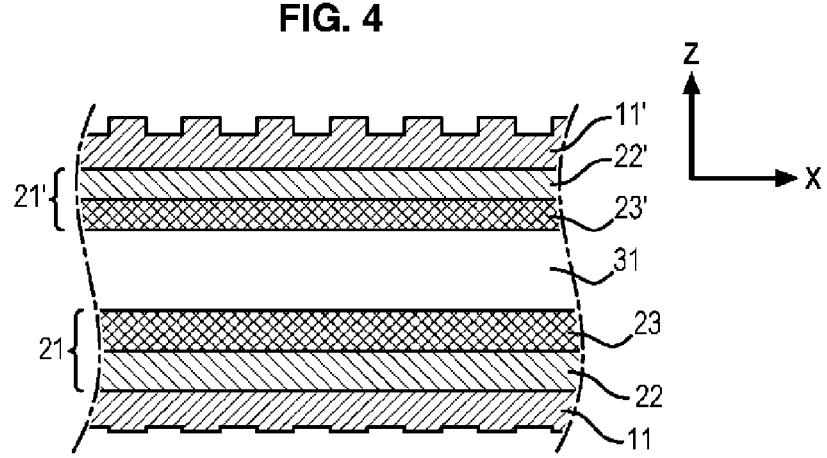
FIG. 4 illustrates a frontal view of an optical filter according to the invention.

The optical filter described here operates in free space and is centred on a wavelength $\lambda_0$ measured in a vacuum, and it is insensitive to polarisation.

The optical filter is illuminated with an incident beam I of spectrally wide light.

A spectrally narrow part of this beam is centred on the wavelength of interest $\lambda_0$ (measured in a vacuum) and is reflected spectrally, whereas the rest will be transmitted without being affected.

The optical filter, designed for a wavelength of conception and an angle of conception (can be zero or not), is insensitive to the polarisation of the incident beam and the filtering wavelength $\lambda_0$ can be modified by changing the angle of incidence (angular adjustability).

The optical filter mainly comprises two gratings 11, 11' arranged on either side of a transparent substrate 31 and each coupled to a waveguide 21, 21'.

Each waveguide supports a propagation mode, of effective index $n_{f1}$ for the first and $n_{f2}$ for the second.

A first grating 11 plane is formed in or on the surface of the first waveguide 21, and is periodic of period $d_1$ along a first axis Ox defining a first orthonormal base Oxyz.

A second grating 11' plane is formed in or on the surface of the second waveguide 21', and is periodic of period $d_2$ along a second axis Ox' defining a second orthonormal base Ox'y'z.

The gratings are arranged relative to each other such that the first axis Ox and the second axis Ox' form a non-zero angle $\xi$.

Vectors V1 and V2 are defined:

$$V_1 = \left[\sin(\theta)\cos(\phi) - \frac{n\lambda}{d_1}\right]\hat{x} + [\sin(\theta)\sin(\phi)]\hat{y}$$

$$V_2 = \left[\sin(\theta)\cos\left(\frac{\pi}{2} - \phi + \xi\right) - \frac{m\lambda}{d_2}\right]\hat{y}' + \left[\sin(\theta)\sin\left(\frac{\pi}{2} - \phi + \xi\right)\right]\hat{x}'$$

corresponding to the directions of propagation of the diffraction orders n and m (relative whole numbers) of the first and of the second grating respectively. The angles θ and Φ are respectively the polar and azimuth angles, and λ the wavelength corresponding to the incident beam. Therefore the equations $$\|V_1\| \approx n_{f1} \quad (1):$$

$$\|V_2\| \approx n_{f2}; \text{ and} \quad (2):$$

$$V_1 \cdot V_2 = 0 \quad (3):$$

translate respectively: the condition of excitation of the first mode via the first grating, the condition of excitation of the second mode via the second grating, and the condition of orthogonality between them of the fields of both excited modes. It is possible to find a set of couples (θ, Φ) of angles of polar and azimuth incidence, such that equations (1) and (2) are verified for the same wavelength of incidence λ. The first and the second mode are excited simultaneously (the dispersion relations are degenerated). The filter is therefore adjustable as a function of the angles of polar and azimuth incidence. Also, for a couple ($\theta_0$, $\Phi_0$) of this set, equation (3) also is verified. The directions of propagation of the modes are orthogonal to each other, as are their fields, and the filter is independent of polarisation. This property is relatively well conserved around the point ($\theta_0$, $\Phi_0$): the filter is independent of polarisation and adjustable in wavelength as a function of incidence, around this point.

In particular, when the gratings are identical, there is $d_1 = d_2 = d$, and when, in addition the two waveguides are identical there is $n_{f1} = n_{f2}$. The set of couples of angles of polar and azimuth incidence, such as equations (1) and (2) are verified for the same wavelength of incidence λ, is such that θ varies from $-\pi/2$ to $\pi/2$ radians, and $\Phi = \pi/4 + \xi/2$ radians irrespective of θ. The first and second propagation modes can be excited simultaneously, irrespective of the angle of polar incidence, without modifying the angle of azimuth incidence, and therefore without modifying the direction of the plane of incidence. The dispersion relations are degenerated, irrespective of the angle of polar incidence, when the angle of azimuth incidence is $\Phi = \pi/4 + \xi/2$: the filter is adjustable in wavelength as a function of the angle of polar incidence, when the plane of incidence contains the bisector of the directions of periodicity of the two gratings. Also, for an angle $\theta_0$, and a wavelength $\lambda_0$, the directions of propagation of the modes are orthogonal to each other, as are their fields, and the filter is independent of polarisation. This property is conserved over a wide range of angles of polar incidence around $\theta_0$: the filter is independent of polarisation and adjustable in wavelength as a function of incidence, around this point.

When the first grating is illuminated by an incident beam such that the plane of incidence contains the bisector of the directions of periodicity of the two gratings, the choice of the angle ξ and of the period d allows for the first and second propagation modes to be orthogonal for an angle of incidence of conception $\theta_0$ and a wavelength of conception (or of interest) $\lambda_0$ of the determined light beam.

The choice of the period d and the relative orientation (angle ξ between the gratings) of their lines reflect or not any polarisation light beam, only as a function of its angle of incidence and its wavelength.

This gives a spectrally selective and adjustable optical filter which is independent of the polarisation of the incident beam.

By way of advantage, the waveguides are each constituted by a plurality of layers made of material transparent to the wavelength of interest.

The waveguides 21, 21' are each preferably constituted by two layers of dielectric material of different refractive index.

By way of advantage, the materials used to form the waveguides are selected such that at least one of them has a refractive index greater than the refractive index of the substrate 31 arranged between the two waveguides.

Example of Particular Embodiment

A particular embodiment of an optical filter according to the invention is described here, which has been tested digitally.

Stacking the different layers constituting the optical filter can be done via a known technique of type LPCVD (Low-Pressure Chemical Vapor Deposition).

The gratings can be formed by optical lithography followed by wet etching.

Other techniques known to the person skilled in the art can be used to implement the optical filter.

It is assumed that the angle of incidence of conception is $\theta 0 = 15°$, that the wavelength of interest is $\lambda_0 = 1.6$ μm, that the diffraction orders selected to excite the first and second modes are m=−1 and n=−1, resulting in ξ=−11° (Φ=50.5° and a period d=838 nm. The space between the grooves is $D_1 = D_2 = 300$ nm and the height of each groove is h=70 nm, resulting in a filtering bandwidth of 0.12 nm. The waveguides 21, 21' are constituted by a stack of two layers 22, 23 of material of refractive indices $n_{22} = 1.47$ and $n_{23} = 2.07$ and height $h_{22} = 140.4$ nm, $h_{23} = 310.2$ nm.

Also, between the waveguides 21, 21' a substrate 31 of refractive index $n_{31} = 1.448$ and thickness $h_{31} = 350$ μm is arranged.

FIG. 5 illustrates the maximal and minimal values when polarisation of the incident wave describes all the accessible states of polarisation of the coefficient of reflection as a function of the wavelength of the optical filter hereinabove.

In this figure, it is evident that on the resonance the coefficient of reflection is 100% and the minimal (dashes) and maximal (solid lines) curves are superposed, indicating that the resonance peak is independent of the polarisation.

The invention claimed is:

1. An optical filter insensitive to polarisation centred on a wavelength ($\lambda_0$) measured in a vacuum, comprising:
   a first waveguide supporting a first propagation mode;
   a second waveguide supporting a second propagation mode;
   a first grating formed in or on the surface of the first waveguide, the first grating being periodic of period $d_1$ at least along a first axis Ox defining a first orthonormal base Oxyz;
   a second grating formed in or on the surface of the second waveguide, the second grating being periodic of period $d_2$ at least along a second axis Ox' defining a second orthonormal base Ox'y'z;
   wherein the first and the second gratings are arranged one above another and are such that a third axis Oz is normal to the surface of the waveguides and that the first axis Ox and the second axis Ox' form an angle ξ different than +−π/2 radians such that when the first grating is illuminated by a light beam the first and second propagation modes are excited and their fields are orthogonal for an angle of incidence of the light beam, and the first and second gratings have respective diffraction orders n and m, wherein the respective directions of propagation $V_1$ and $V_2$ of the diffraction orders n and m are defined by the formulae:

$$V_1 = \left[\sin(\theta)\cos(\Phi) - \frac{n\lambda}{d_1}\right]\hat{x} + [\sin(\theta)\sin(\Phi)]\hat{y}$$

$$V_2 = \left[\sin(\theta)\cos\left(\frac{\pi}{2} - \Phi + \xi\right) - \frac{m\lambda}{d_2}\right]\hat{y}' + \left[\sin(\theta)\sin\left(\frac{\pi}{2} - \Phi + \xi\right)\right]\hat{x}'$$

with $\theta$ and $\Phi$ being polar and azimuth angles, respectively, and $\lambda$ being the wavelength of the light beam, and wherein the condition of excitation of the first mode via the first grating is $\|V_1\| \approx n_{f1}$, the condition of excitation of the second mode via the second grating is $\|V_2\| \approx n_{f2}$, and the condition of orthogonality between the fields of both excited modes is $V_1 \cdot V_2 = 0$.

2. The optical filter according to claim 1, in which the first grating and the second gratings are identical and each comprises a series of identical patterns or grooves of period $d=d_1=d_2$ and in which the angle $\xi$ is such that, for an incident beam of any angle of incidence on the first grating, the polar angle $\theta$ varies from $-\pi/2$ to $\pi/2$ radians, and the azimuth angle $\Phi$ equals $\pi/4 + \xi/2$ radians.

3. The optical filter according to claim 2, in which the series of patterns or identical grooves has width D, and height h.

4. The optical filter according to claim 3, in which the wavelength is equal to $\lambda_0=1.6$ μm, the gratings have grooves of period d=838 nm, width D=300 nm and height h=70 nm.

5. The optical filter according to claim 1, in which the first waveguide and the second waveguide are identical and are each constituted by a plurality of layers made of material transparent to the wavelength of interest.

6. The optical filter according to claim 5, in which the first waveguide and the second waveguide are each constituted by two layers of dielectric material of different refractive index.

7. The optical filter according to claim 1, comprising a glass substrate arranged between the first waveguide and the second waveguide.

8. The optical filter according to claim 1, comprising a glass substrate arranged between the first grating and the second grating.

9. The optical filter according to claim 1, comprising a glass substrate arranged between the first grating and the second waveguide.

10. An optical filter insensitive to polarisation centred on a wavelength ($\lambda_0$) measured in a vacuum, comprising:
   a first waveguide supporting a first propagation mode;
   a second waveguide supporting a second propagation mode;
   a first grating formed in or on the surface of the first waveguide, the first grating being periodic at least along a first axis Ox defining a first orthonormal base Oxyz;
   a second grating formed in or on the surface of the second waveguide, the second grating being periodic at least along a second axis Ox' defining a second orthonormal base Ox'y'z;
   wherein the first and the second gratings are arranged one above another and are such that a third axis Oz is normal to the surface of the waveguides and that the first axis Ox and the second axis Ox' form a non-zero angle different than +−π/2 radians such that when the first grating is illuminated by a light beam the first and second propagation modes are excited and their fields are orthogonal for an angle of incidence of the light beam.

11. The optical filter according to claim 10, in which the first grating and the second gratings are identical and each comprises a series of identical patterns or grooves of period $d=d_1=d_2$ and in which the angle $\xi$ is such that, for an incident beam of any angle of incidence on the first grating, a polar angle $\theta$, varies from $-\pi/2$ to $\pi/2$ radians, and an azimuth angle $\Phi$, equals $\pi/4 + \xi/2$ radians.

12. The optical filter according to claim 11, in which the series of patterns or identical grooves has width D, and height h.

13. The optical filter according to claim 12, in which the wavelength is equal to $\lambda_0=1.6$ μm, the gratings have grooves of period d=838 nm, width D=300 nm and height h=70 nm.

14. The optical filter according to claim 10, in which the first waveguide and the second waveguide are identical and are each constituted by a plurality of layers made of material transparent to the wavelength of interest.

15. The optical filter according to claim 14, in which the first waveguide and the second waveguide are each constituted by two layers of dielectric material of different refractive index.

16. The optical filter according to claim 10, comprising a glass substrate arranged between the first waveguide and the second waveguide.

17. The optical filter according to claim 10, comprising a glass substrate arranged between the first grating and the second grating.

18. The optical filter according to claim 10, comprising a glass substrate arranged between the first grating and the second waveguide.

* * * * *